United States Patent
Wright (10) Patent No.: US 9,852,645 B2
(45) Date of Patent: Dec. 26, 2017

(54) GLOBAL POSITIONING SYSTEM ("GPS") INDEPENDENT NAVIGATION SYSTEM FOR A SELF-GUIDED AERIAL VEHICLE UTILIZING MULTIPLE OPTICAL SENSORS

(71) Applicant: THE BOEING COMPANY, Chicago, IL (US)

(72) Inventor: Steven A. Wright, Chicago, IL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/828,052

(22) Filed: Aug. 17, 2015

(65) Prior Publication Data

US 2017/0053536 A1   Feb. 23, 2017

(51) Int. Cl.
| | |
|---|---|
| G08G 5/00 | (2006.01) |
| H04N 5/247 | (2006.01) |
| H04N 5/33 | (2006.01) |
| H04N 7/18 | (2006.01) |
| G01S 19/39 | (2010.01) |

(Continued)

(52) U.S. Cl.
CPC .......... *G08G 5/0047* (2013.01); *B64D 47/08* (2013.01); *F41G 7/20* (2013.01); *F41G 7/343* (2013.01); *F41G 7/346* (2013.01); *G01S 5/16* (2013.01); *G01S 19/39* (2013.01); *G05D 1/00* (2013.01); *G06T 7/74* (2017.01); *H04N 5/247* (2013.01); *H04N 5/33* (2013.01); *H04N 7/183* (2013.01); *F41G 7/36* (2013.01); *G01S 19/15* (2013.01); *G01S 19/18* (2013.01); *G01S 19/48* (2013.01); *G06T 7/70* (2017.01); *G06T 2207/10032* (2013.01); *G06T 2207/30184* (2013.01); *G06T 2207/30244* (2013.01)

(58) Field of Classification Search
CPC ...... G08G 5/0047; B64D 47/08; G01S 19/39;
G01S 19/15; G01S 19/18; G01S 19/48;
G01S 5/16; H04N 5/247; H04N 5/33;
H04N 7/183; H04N 1/18; F41G 7/20;
F41G 7/343; G06T 7/70; G05D 1/00
USPC .......................................................... 701/3
See application file for complete search history.

(56) References Cited

U.S. PATENT DOCUMENTS

| | | |
|---|---|---|
| 3,700,801 A | 10/1972 | Dougherty |
| 9,031,725 B1 | 5/2015 | DiEsposti |

(Continued)

FOREIGN PATENT DOCUMENTS

| | | |
|---|---|---|
| DE | 10 2007 054 950 A1 | 8/2009 |
| EP | 0 427 431 A2 | 5/1991 |

(Continued)

OTHER PUBLICATIONS

European Patent Office Partial European Search Report, Application No. 16182339.8-1812, dated Jan. 13, 2017.

(Continued)

*Primary Examiner* — Atul Trivedi
(74) *Attorney, Agent, or Firm* — Francisco A. Rubio-Campos; Apogee Law Group P.C.

(57) ABSTRACT

Disclosed is a Global Positioning System ("GPS") independent navigation system ("GINS") for a self-guided aerial vehicle ("SAV"). The SAV has a housing, where the housing has an outer surface, a length, a front-end, and a longitudinal axis along the length of the housing. The GINS includes a first optical sensor, a second optical sensor, a storage unit, and a comparator.

20 Claims, 9 Drawing Sheets

(51) Int. Cl.
*B64D 47/08* (2006.01)
*F41G 7/20* (2006.01)
*F41G 7/34* (2006.01)
*G01S 5/16* (2006.01)
*G05D 1/00* (2006.01)
*G06T 7/73* (2017.01)
*G01S 19/15* (2010.01)
*G01S 19/18* (2010.01)
*G01S 19/48* (2010.01)
*G06T 7/70* (2017.01)
*F41G 7/36* (2006.01)

(56) References Cited

U.S. PATENT DOCUMENTS

| | | | | |
|---|---|---|---|---|
| 9,225,916 | B2* | 12/2015 | Friel | H04N 5/33 |
| 9,456,185 | B2* | 9/2016 | Oakley | B64C 27/04 |
| 2002/0004691 | A1* | 1/2002 | Kinashi | G01C 21/24 |
| | | | | 701/4 |
| 2004/0056952 | A1* | 3/2004 | Konya | B64C 25/50 |
| | | | | 348/117 |
| 2007/0268366 | A1* | 11/2007 | Raskar | G01J 1/42 |
| | | | | 348/143 |
| 2010/0292871 | A1* | 11/2010 | Schultz | G01C 21/00 |
| | | | | 701/3 |
| 2013/0162835 | A1* | 6/2013 | Forland | H04N 5/332 |
| | | | | 348/164 |
| 2013/0235199 | A1* | 9/2013 | Nixon | G01C 11/06 |
| | | | | 348/144 |
| 2013/0335550 | A1* | 12/2013 | Rochenski | G08B 17/125 |
| | | | | 348/82 |
| 2014/0267631 | A1* | 9/2014 | Powers | H04N 5/23241 |
| | | | | 348/47 |
| 2014/0374541 | A1* | 12/2014 | Wang | B64D 47/08 |
| | | | | 244/236 |
| 2015/0022656 | A1* | 1/2015 | Carr | G06K 9/0063 |
| | | | | 348/117 |
| 2015/0158513 | A1* | 6/2015 | Costa | H04N 5/23203 |
| | | | | 348/144 |
| 2016/0076892 | A1* | 3/2016 | Zhou | B64C 39/024 |
| | | | | 701/3 |
| 2016/0117853 | A1* | 4/2016 | Zhong | B64C 39/024 |
| | | | | 345/634 |
| 2016/0122038 | A1* | 5/2016 | Fleischman | G06T 7/73 |
| | | | | 701/2 |
| 2016/0198088 | A1* | 7/2016 | Wang | H04N 5/23238 |
| | | | | 348/36 |
| 2016/0364989 | A1* | 12/2016 | Speasl | G08G 5/0034 |

FOREIGN PATENT DOCUMENTS

| | | |
|---|---|---|
| EP | 2 372 308 A2 | 10/2011 |
| EP | 2 472 221 A1 | 7/2012 |
| EP | 2 549 288 A1 | 1/2013 |

OTHER PUBLICATIONS

European Patent Office Extended European Search Report, Application No. 16182339.8—1812/3133413, dated Jun. 9, 2017.

* cited by examiner

GLOBAL POSITIONING SYSTEM ("GPS") INDEPENDENT NAVIGATION SYSTEM FOR A SELF-GUIDED AERIAL VEHICLE UTILIZING MULTIPLE OPTICAL SENSORS

STATEMENT REGARDING FEDERALLY SPONSORED RESEARCH AND DEVELOPMENT

This invention was made with United States Government ("USG") support and the USG has certain rights in the invention.

BACKGROUND

1. Field

The present invention relates to self-guided aerial vehicles, and more, particularly to non-Global Position System ("GPS") enabled self-guided aerial vehicles.

2. Related Art

Many modern air-to-ground systems include self-guided aerial vehicles capable of navigating standoff distances to a target. Most of these systems include control surfaces that allow the aerial vehicle to travel or glide through the air to their respective targets. Generally, all of these types of systems are "launch-and-leave" (also known as "fire-and-forget") type systems that do not require further guidance after launch and are capable of arriving at an intended location without the launcher being in line-of-sight of the location.

Generally, most types of self-guided aerial vehicles guide themselves to a desired location utilizing some combination of sensor technologies that include, for example, inertial measurement units ("IMUs" such as, for example, gyroscopes, altimeters, accelerometers), Global Position System ("GPS") navigation systems, radar, laser, infrared homing optics, terrain matching, or star-tracking technologies. Of these, GPS-enabled aerial vehicles have become the most common.

Existing GPS navigation systems include NAVSTAR (an acronym derived from either "Navigation Signal Timing and Ranging" or "Navigation Satellite Timing and Ranging") developed and operated by the United States Air Force and the Global Navigation Satellite System ("GLONASS") developed by the Soviet Union and presently operated by the Russia Aerospace Defense Forces. Future GPS navigation systems will include global navigation satellite system ("GNSS") known as GALILEO that is be produced by the European Space Agency ("ESA") of the European Union ("EU"), the Indian Regional Navigation Satellite System ("IRNSS") that is being produced by the Indian Space Research Organization ("ISRO"), and Chinese BeiDou Navigation Satellite System being produced by China.

Unfortunately, anti-GPS technologies (such as, for example, GPS spoofing and jamming) are also advancing, creating situations in which a self-guided aerial vehicle may need to pass through contested degraded operation ("CDO") conditions, which may include either GPS-denied or GPS-degraded environments. Once GPS is denied, the other known navigation technologies, such as IMUs, target-looking imaging sensors (such as, for example, radar, electro-optical, and infrared), and star-tracking technologies may not be capable of providing highly accurate delivery accuracy at the desired location when the time of flight or distance traveled is large because these navigation technologies they either provide mid-course navigation or terminal accuracy. Moreover star-tracking technologies may be limited by ambient conditions (i.e., weather, ambient lighting, etc.), the sensors are expensive, and the processing may be intensive.

SUMMARY

Disclosed is a Global Positioning System ("GPS") independent navigation system ("GINS") for a self-guided aerial vehicle ("SAV"). The SAV has a housing, where the housing has an outer surface, a length, a front-end, and a longitudinal axis along the length of the housing. The GINS may include a first optical sensor, second optical sensor, storage unit, and comparator. The first optical sensor is located along the outer surface of the housing and is aimed at a first angle away from the outer surface. The second optical sensor is located at the front-end of the housing and is aimed in a direction approximately along the longitudinal axis. The storage unit is configured to include a database of a plurality of reference images and the comparator is in signal communication with the first optical sensor, the second optical sensor, and the storage unit. The first optical sensor is configured to acquire a plurality of look-down images of a view beneath the SAV when the SAV is in flight and the second optical sensor is configured to acquire a plurality of look-forward images of the frontal view in front of the SAV when the SAV is in flight. Moreover, the comparator is configured to compare the acquired plurality of look-down and look-forward images to the plurality of reference images in the database, and, in response, produce navigation information utilized to guide the inflight SAV.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

The embodiments described herein provide an affordable Global Positioning System ("GPS") independent navigation system ("GINS") for a self-guided aerial vehicle that is capable of navigating the self-guided aerial vehicle ("SAV") without the utilization of GPS location signals. The SAV has a housing, where the housing has an outer surface, a length, a front-end, and a longitudinal axis along the length of the housing. The GINS may include a first optical sensor, second optical sensor, storage unit, and comparator. The first optical sensor is located along the outer surface of the housing and is aimed at a first angle away from the outer surface. The second optical sensor is located at the front-end of the housing and is aimed in a direction approximately along the longitudinal axis. The storage unit is configured to include a database of a plurality of reference images and the comparator is in signal communication with the first optical sensor, the second optical sensor, and the storage unit. The first optical sensor is configured to acquire a plurality of look-down images of a view beneath the SAV when the SAV is in flight and the second optical sensor is configured to acquire a plurality of look-forward images of the frontal view in front of the SAV when the SAV is in flight. Moreover, the comparator is configured to compare the acquired plurality of look-down and look-forward images to the plurality of reference images in the database, and, in response, produce navigation information utilized to guide the inflight SAV.

In operation when the SAV is in flight, the GINS performs a method for guiding an inflight SAV. The method may include acquiring a plurality of look-down images of a view beneath the SAV when the SAV is in flight, with the first optical sensor, and acquiring a plurality of look-forward images of the frontal view in front of the SAV when the SAV is in flight with the second optical sensor. Then method then compares the acquired plurality of look-down and look-forward images to the plurality of reference images in the database, and, in response, produces navigation information utilized by the navigation system to guide the inflight SAV. The navigation information is then provided to the navigation system, where the navigation system utilizes the navigation information to guide the inflight SAV.

Figure 1:
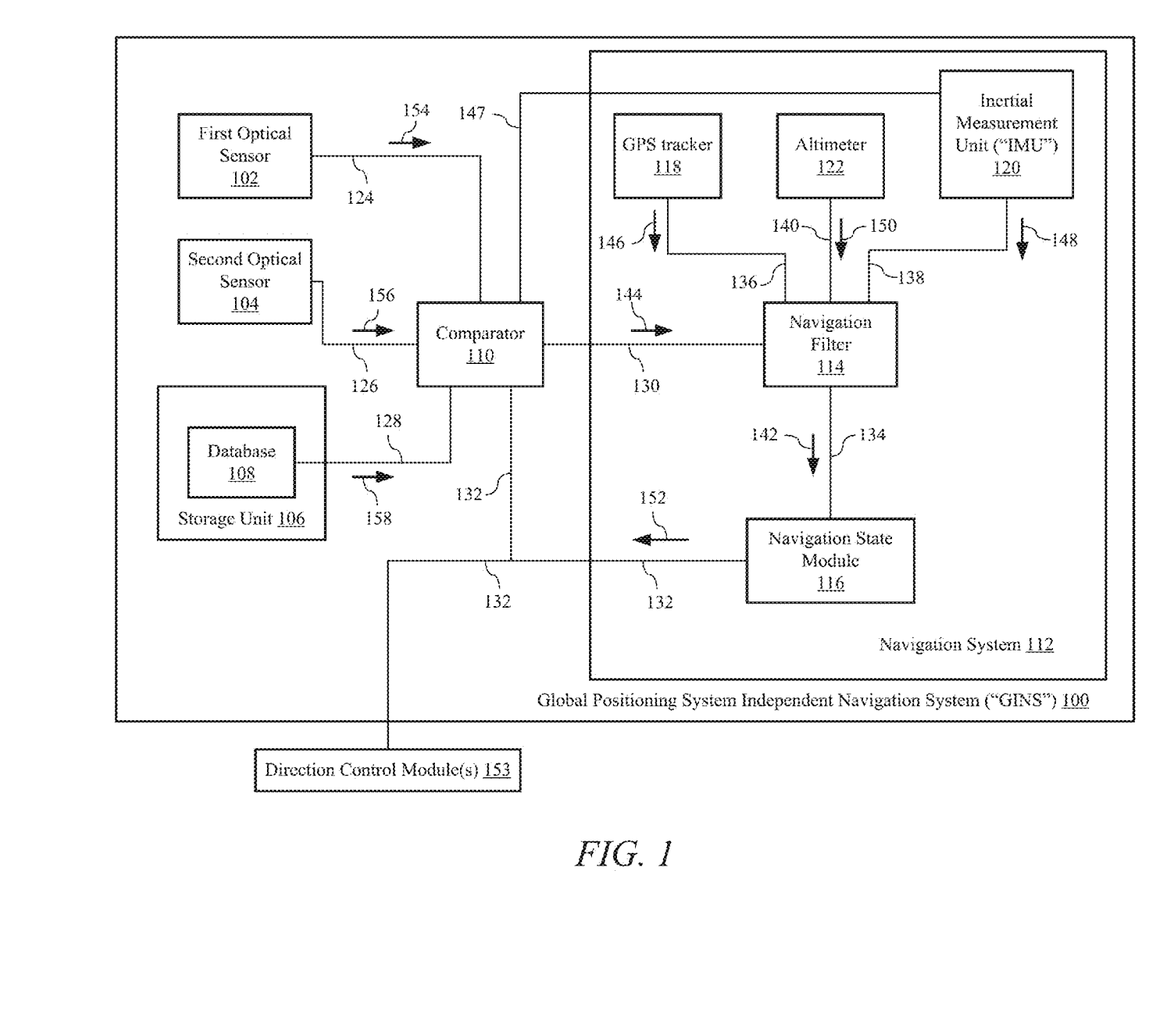
FIG. 1 is a system block diagram of an example of an implementation of a Global Positioning System ("GPS") independent navigation system ("GINS") for a self-guided aerial vehicle ("SAV").

FIG. 1, a system block diagram of an example of an implementation of a Global Positioning System ("GPS") independent navigation system ("GINS") 100 for a self-guided aerial vehicle ("SAV") is shown. In this example, the GINS 100 includes a first optical sensor 102, a second optical sensor 104, a storage unit 106 having a database 108, a comparator 110, and a navigation system 112. The navigation system 112 may include a navigation filter 114, a navigation state module 116, a GPS tracker 118, an inertial measurement unit ("IMU") 120, and an altimeter 122. The comparator 110 may be in signal communication with the first optical sensor 102, second optical sensor 104, database 108 of the storage unit 106, navigation filter 114, and navigation state module 116 via signal paths 124, 126, 128, 130, and 132, respectively. Additionally, the navigation filter 114 may be in signal communication with the navigation state module 116, GPS tracker 118, IMU 120, and altimeter 122 via signal paths 134, 136, 138, and 140, respectively.

The first optical sensor 102 and second optical sensor 104 may be cameras capable of obtaining a plurality of digital pictures (i.e., images). As an example, the first optical sensor 102 and second optical sensor 104 may be and electro-optical ("EO") cameras or infrared ("IR") cameras, such as, for example, thermographic forward-looking infrared ("FLIR") cameras that sense IR radiation. The first optical sensor 102 and second optical sensor 104 may be known strap-down optical sensors. As a further example, the first optical sensor 102 and the second optical sensor 104 may be optionally the same type of EO or IR cameras. Whether the same of different, generally the first optical sensor 102 and second optical sensor 104 are optical sensors with a wide field of view such as, for example, about 30 degrees.

Figure 2:
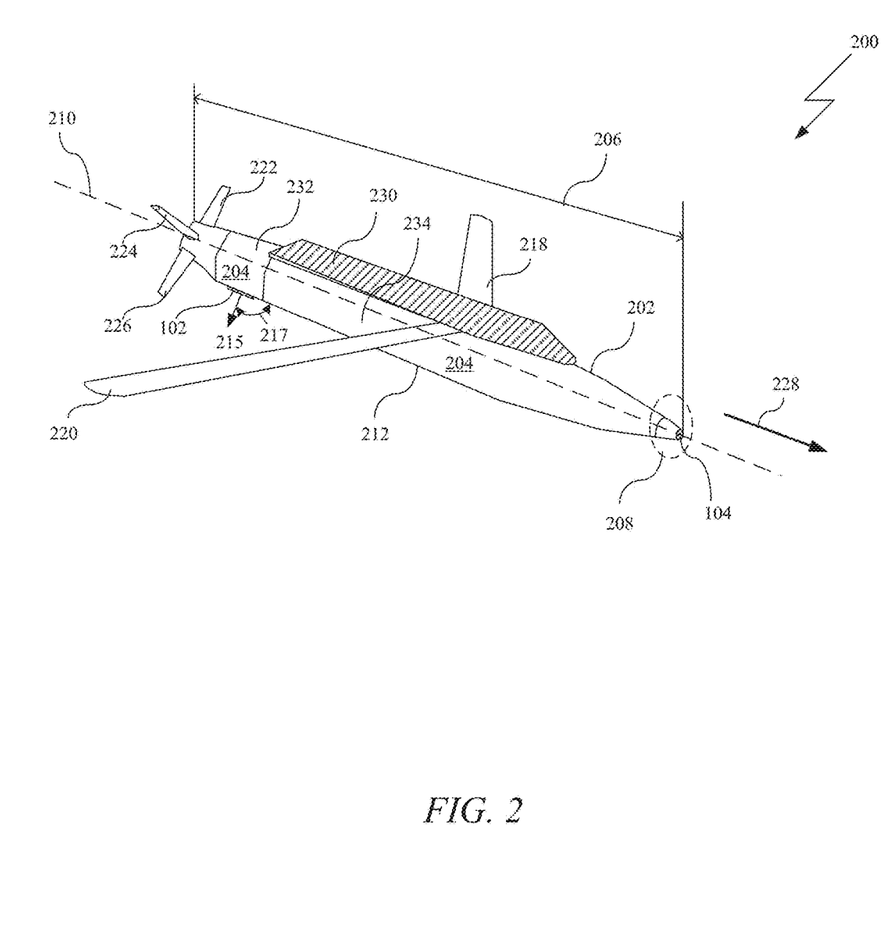
FIG. 2 is a prospective side-view of an example of an implementation of a SAV having a GINS.

In this example, (as shown in FIG. 2) the SAV 200 has a housing 202, where the housing 202 has an outer surface 204, a length 206, a front end 208, and a longitudinal axis 210 along the length 206 of the housing 202. The first optical sensor 102 may be placed (i.e., located) along the outer surface 204 of the housing 202, while the second optical sensor 104 may be placed (i.e., located) at the front end 208 of the housing 202. The first optical sensor 102 may be place approximately perpendicular to the outer surface 204 of the SAV 200 such that a line of sight 215 of the first optical sensor 102 is approximately ninety (90) degrees with respect to the longitudinal axis 210 of the housing 202 of the SAV 200 and approximately normal to the outer surface 204. Moreover, the line of sight 215 of the first optical sensor 102 may be directed at a first angle 217 from the outer surface 204 of the housing 202 of the SAV 200, while a line of sight 228 of the second optical sensor 104 may be directed approximately along the longitudinal axis 210. The first angle 217 may be ninety (90) degrees from the longitudinal axis 210 such that the line of sight 215 of first optical sensor 102 is normal to the outer surface 204 of the housing 202 and at an approximate right angle to the directed direction of the second optical sensor 104. In general, the first optical sensor 102 is configured to acquire, in real-time, a plurality of look-down images of a view beneath the SAV 200 when the SAV 200 is in flight. Similarly, the second optical sensor 104 is configured to acquire, in real-time, a plurality of look-forward images of the frontal view in front of the SAV 200 when the SAV 200 is in flight.

Turning back to FIG. 1, the storage unit 106 may be any type of known data storage device that can be on board the SAV 200 such as, for example, a solid-state memory, read-access memory ("RAM"), read-only memory ("ROM"), electro-mechanical storage device such as, for example, a hard-drive, or other equivalent devices or components. The database 108 may be any type of known organized collection of data of reference image data, which includes a plurality of reference images. The plurality of reference images may be plurality of compressed, or uncompressed, global reference images or regional reference images.

In this example, the reference image data may be geodetically calibrated reference data where the geodetically calibrated reference data is calibrated utilizing the geodetic datum (also known as the geodetic system) that is a coordinate system and set of reference point utilized to locate positions on the Earth. In this example, the geodetically calibrated reference data may be calibrated utilizing the world geodetic system ("WGS") 84 standard, which is generally utilized for cartography, geodesy, and navigation. The WGS 84 standard generally includes a standard coordinate system for the Earth, a standard spheroidal reference surface for raw altitude data, and a gravitational equipotential surface that defines the nominal sea level. Utilizing the WGS 84 standard, the first optical sensor 102 and second optical sensor 104 may be geo-registered with the reference images data of the database 108 such that acquired look-down and look-forward images from the first and second optical sensors 102 and 104, respectively, may be aligned with geodetically calibrated reference data in the plurality of reference images of the database 108.

The comparator 110 may be any device, component, circuit, or module, either hardware, software, or both, that is configured to compare the acquired plurality of look-down and look-forward images to the plurality of reference images in the database 108, and, in response, produce navigation information utilized to guide the inflight SAV. The comparator 110 is configured to perform optical image correlation of the real-time acquired plurality of look-down and look-forward images to reference imagery of the plurality of reference images in the database 108 by comparing image by image to determine whether an acquired real-time look-down or look-forward image matches a stored reference image in the database 108. Example devices for the comparator 110 include a correlator, matched filter, digital signal processor ("DSP"), and a processor. In general, the comparator 110 is configured to perform scene correlation between the acquired real-time look-down or look-forward images and the plurality of stored reference images in the database 108. It is appreciated by those of ordinary skill in the art that a high correlation value indicates a match.

The circuits, components, modules, and/or devices of, or associated with, the improved GINS 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Turning to the navigation system 112, the navigation system 112 is device, component, circuit, or module that is capable of determining the position of the SAV based on the inputs from the comparator 110, GPS tracker 118, IMU 120, and altimeter 122 and utilizing that position to provide navigation correction information to directional controls of the SAV. The directional controls may include control surfaces on the housing, wings, other aerodynamic components, and propulsion systems of the SAV 200 that are utilized to direct the movement of the SAV 200 as it flies a trajectory path to a desired location, target, or both.

In the navigation system 112, the navigation filter 114 may be a navigation fusion device, component, of module, circuit, or other type of device that is configured to receive multiple inputs from the different types of SAV position sensors (i.e., the first and second optical sensors 102 and 104), the GPS tracker 118, IMU 120, and altimeter 122 and, in response, produce an accurate SAV position value 142 that may be transmitted to the navigation state module 116 via signal path 134. In at least some navigation systems, a single sensor may not provide completely accurate SAV position information. As an example, while generally, GPS sensors, such as GPS tracker 118, provide accurate position data of the GPS sensor (and associated navigation system), in GPS degraded or denied areas these GPS sensors may not be capable of providing accurate positional information to the navigation system. As such, fusion technologies have been developed to fuse complementary (sometimes redundant information) from different sources into one represented format of the positional data. In general, this multi-sensor integration and fusion provides robust operation performance, extended spatial coverage, extended temporal coverage, increased degree of confidence, improved position detection, enhanced spatial resolution, improved reliability of system operation, and reduced ambiguity in positional determination. In this example, the navigation filter 114 is configured to fuse the positional information measurements 144, 146, 148, and 150 received from the comparator 110, GPS tracker 118, IMU 120, and altimeter 122, via signal paths 130, 136, 138, and 140, respectively.

As an example, the navigation filter 114 may be a Kalman filter (or an extended Kalman filter) that utilizes the statistical characteristics of a measurement model to recursively estimate the fused data of the different sensors—comparator 110, GPS tracker 118, IMU 120, and altimeter 122. In general, if the navigation filter 114 is a Kalman filter, the navigation filter 114 is capable of fusing the positional information measurements 144, 146, 148, and 150 from the comparator 110, GPS tracker 118, IMU 120, and altimeter 122 and provide both an estimate of the current state of the navigation system 112 and also a prediction of the future state of the navigation system 112. In this example, every "match" result in the comparator 110 between a real-time image 154 and 156 (from the first and second optical sensor 102 and 104) and a reference image 158 from the database 108 are effectively a positional information measurement 144 from the comparator 110 that is transmitted to the Kalman filter of the navigation filter 114 via signal path 130. This resulting information produced by the Kalman filter, related to the position value 142, is then transmitted to the navigation state module 116.

The GPS tracker 118 is a device, component, module, or circuit capable of receiving GPS signals from a GPS satellite constellation. The GPS tracker 118 may be a GPS tracker or a GPS receiver. A GPS receiver is a device capable of receiving the GPS signals and, in response, determine both the pseudo-range values for the received GPS signals and a resulting location of the GPS receiver based on the received pseudo-range values. A GPS tracker is a device capable of only receiving the GPS signals and determining the corresponding pseudo-range values without determining a resulting location of the GPS tracker based on the pseudo-range values.

The IMU 120 is generally an electronic device, component, module, or circuit that is configured to measure and report the velocity and orientation of the SAV 200 plus the gravitational forces experienced by the SAV 200. The IMU 120 may include a combination of accelerometers, gyroscopes, and magnetometers and may be part of an inertial navigation system (not shown) within the navigation system 112.

The IMU 120 may also be optionally in signal communication with the comparator 110 via a signal path 147. If the IMU 120 is in signal communication with the comparator 110, the IMU 120 may provide the comparator 110 with IMU information 149 that allows the comparator 110 to determine whether the comparator 110 should compare the plurality of reference images 158 against either the real-time look-down images 154 (of the first optical sensor 102) or the real-time look-forward images 156 of the second optical sensor 104. In the case of the SAV being directed at a location on the ground, the comparator 110 may switch from comparing the plurality of reference images 158 against the real-time look-down images 154 to comparing the plurality of reference images 158 against the real-time look-forward images 156 at a transition zone along the flight path of the SAV 200 when the SAV 200 transitions from an approximately level flight during a mid-cruise portion along the flight path to an orientation change of the SAV 200 where the SAV 200 changes attitude and pitches forward into a dive (i.e., "noses down") to travel along a termination portion of the flight path where the SAV 200 travels to the location.

When this transition happens, the real-time look-down images 154 acquired by the first optical sensor 102 will begin to change based on the attitude of the SAV 200 to a possible point along the flight path where the first optical sensor 102 is no longer able to acquire images of the ground below the SAV 200. Similarly, the second optical sensor 104 will transition from acquiring real-time forward-looking images of the horizon in front of the SAV 200 to acquiring real-time look-forward images 156 of the ground in front of the SAV 200. Since, the comparator 110 is matching real-time "ground" images of the first and second optical sensors 102 and 104 to the plurality of reference images 158 the comparator 110 may optionally ignore or stop receiving and processing images from either the first or second optical sensor 102 and 104 when either of the sensors 102 and 104 is not acquiring real-time images of the ground. The decision to ignore or stop receiving and processing non-ground images from either the first or second optical sensor 102 and 104 may be based on detecting whether one of the sensors 102 or 104 is producing real-time non-ground images (such as, for example, horizon images), receiving IMU information 149 indicating that the SAV 200 is transitioning into a terminal phase of the flight path were the first optical sensor 102 will not acquire real-time ground images, or both.

Based on this example, in the transition zone of the flight path, there may be a situation where the pitch of the SAV 200 is such that both the first and second optical sensors 102 and 104 are able to acquire real-time ground images. In this situation, the comparator 110 may utilize both the real-time acquired images 154 and 156 of both the first and second optical sensor 102 and 104 to compare against the reference images 158 of the database 108. In this example, by comparing a reference image 158 (for the database 108) against two acquired real-time images 154 and 156 of the ground, the accuracy of the comparison is increased.

The altimeter 122 may be a barometric altimeter, radar altimeter, or both. The navigation state module 116 may be a part of the navigation filter 114 or a separate component. The navigation state module 116 is a device, component, module, or circuit that is configured to receive the position value 142 information and produce a resulting position value 152 for the navigation system 112 (and by extension the GINS 100 and SAV 200). This position value 152 may be passed to the comparator 110 and a direction control module (s) 153 of the SAV 200 via signal path 132.

The GINS 100 may also include an optional third optical sensor (not shown) in signal communication with the comparator 110. Similar to the first optical sensor 102, the third optical sensor may be also a camera capable of acquiring a plurality of digital images. As an example, the third optical sensor may be an IR camera, such as, for example, a FLIR camera that senses IR radiation. Similar to the first optical sensor 102, the third optical sensor may be placed (i.e., located) also along the outer surface 204 of the housing 202. The third optical sensor may be located approximately perpendicular to the outer surface 204 of the SAV 200 such that the line of sight of the third optical sensor is in a direction normal to the outer surface 204 and oriented approximately ninety (90) degrees with respect to the longitudinal axis 210 of the housing 202 of the SAV 200. Moreover, the third optical sensor may be directed in a direction that is at a third angle from the outer surface 204 of the housing 202 of the SAV 200. The third angle may be ninety (90) degrees such that the third optical sensor is directed in a direction that is normal to the outer surface 204 of the housing 202 and at an approximate right angle to the directed direction of the second optical sensor 104. In a particular embodiment, the third optical sensor is also configured to acquire, in real-time, another plurality of look-down images of a view beneath the SAV 200 when the SAV 200 is in flight.

In this example, the comparator 110 is configured to compare image by image whether an acquired real-time look-down (of both the first optical sensor 102 and third optical sensor) or look-forward image matches a stored reference image in the database 108. Similar to the first optical sensor 102, the third optical sensor also may be geo-registered with the reference images data of the database 108 such that acquired look-down images from the third optical sensor also may be aligned with the geodetically calibrated reference data in the plurality of reference images of the database 108.

In these examples, the first optical sensor 102 may be located on the outer surface 204 of the SAV 200 such that the first optical sensor 102 is either directed downward in a normal direction from the bottom 212 of the SAV 200 towards the ground below when the SAV 200 is in flight and traveling in a direction 228 that is collinear with the longitudinal axis 210 of the housing 202 of the SAV 200 or directed downward at an oblique angle (either angle 504 or 634 from FIGS. 5 and 6) from the normal direction from the bottom 212 of the SAV 200 towards the ground below when the SAV 200 is in flight and at a right angle from the direction 228 of travel of the SAV 200. The oblique angle may be either towards a first lower side portion (not shown) or a second lower side portion (not shown) of the housing 202 of the SAV 200. Similarly, the third optical sensor also may be located on the outer surface 204 of the SAV 200 such that the third optical sensor is also directed downward in a normal direction from the bottom 212 of the SAV 200 towards the ground below when the SAV 200 is in flight such that the third optical sensor is directed in the same direction as the first optical sensor 102. In this example, the first optical sensor 102 and third optical sensor may be located adjacent to each other on the bottom 212 of the SAV 200 along the longitudinal axis 210.

Alternatively, the third optical sensor may be directed downward at an oblique angle from the normal direction from the bottom 212 of the SAV 200 towards the ground below when the SAV 200 is in flight and at a right angle from the direction 228 of travel of the SAV 200. In this alternative example, the first optical sensor 102 and third optical sensor may be located adjacent to each other on the lower side portion (shown as 512 and 612 in FIGS. 5 and 6) of the SAV 200 along the longitudinal axis 210. In another alternative example, the first optical sensor 102 and third optical sensor may be located at opposite sides of the lower side portion of the SAV 200 such that the first optical sensor 102 is directed downward at a first oblique angle from the normal direction from the bottom 212 of the SAV 200 towards the ground below when the SAV 200 is in flight and at a right angle from the direction 228 of travel of the SAV 200 and the third optical sensor is directed downward at a second oblique angle from the normal direction from the bottom 212 of the SAV 200 towards the ground below, where the first and second oblique angles are different. As an example, the spacing angle between the first and second oblique angles may be approximately 90 degrees or less.

As an example of operation using the first and second optical sensors 102 and 104, when the SAV 200 is launched and in-flight, the first optical sensor 102 acquires a plurality of look-down images, in real-time, of view beneath the SAV 200 when the SAV 200 is in flight and second optical sensor 104 also acquires a plurality of look-forward images, in real-time, of the frontal view in front of the SAV 200. The plurality of look-down images 154 and plurality of look-forward images 156 are transmitted to the comparator 110 along signal paths 124 and 126, respectively. The comparator 110 also receives the position value 152 of the SAV 200 for the navigation system 112. The comparator 110 then utilizes the information from the position value 152 to access a single reference image (or a sub-plurality of reference images) from the database 108 to compare against the plurality of look-down images 154 and plurality of look-forward images 156. The comparator 110 the performs a scene correlation between the single reference image, or a sub-plurality of reference images, and the plurality of look-down images 154 and plurality of look-forward images 156 to determine if there is a match. Once a match is determined, the comparator 110 may then "track" the position of the SAV 200 as it moves along its flight path by noting the differences of the new real-time images 154 and 156 being produced by the first and second optical sensors 102 and 104 against the selected reference image from the database 108 where the selected reference image was selected because it "matched" (i.e., had a high scene correlation) between the previously acquired images 154 and 156.

When the new real-time acquired images 154 and 156 from the first and second optical sensors 102 and 104 begin to reach the edges of the selected reference image that the comparator 110 is using, the comparator 110 is configured to retrieve additional reference images 158 from the database 108 that have high scene correlation with the new real-time acquired images 154 and 156. This process continues as the comparator 110 tracks the position of the SAV 200 against the reference images 158 of the database 108. The match results of the comparator 110 are then transmitted as real-time positional information measurement 144 to the navigation filter 114 via signal path 130. In this example, the comparator 110 may perform an image registration and scene correlation process. In general, this process may include bringing both the reference image 158 (from the database 108) and a real-time image (either real-time image 154 or 156 from the first or second optical sensor 102 and 104) into a common projection space and then matching the statistics applied to find the correct image alignment.

An example process for matching the statistics applied to find the correct image alignment includes utilizing a general pattern match ("GPM") method. In another approach, the comparator 110 may alternatively perform a terrain matching process that includes digital elevation map correlation with sensed terrain from the real-time images 154 and 156. This alternative process utilizes elevation recovery algorithms for passive IR sensors to compare the fight path of the SAV 200 to a known terrain database. This method may utilize, for example, the terrain matching process.

Once the navigation filter 114 receives the real-time positional information measurements 144 from the comparator 110, the navigation filter 114 combines them with any available GPS positional information measurement 146, IMU positional measurements 148 and altimeter positional measurements 150 to produce a fused position value 142 that is transmitted to the navigation state module 116 to produce the accurate position value 152.

Turning to FIG. 2, a prospective side-view of an example of an implementation of a SAV 200 having a GINS (such as the GINS 100 shown in FIG. 1) is shown. The SAV 200 may include a housing 202, where the housing 202 has an outer surface 204, a length 206, a front-end 208, a longitudinal axis 210 along the length 206 of the housing 202, and a bottom 212. The SAV 200 may also include the first optical sensor 102 located at the bottom 212 of the SAV 200 and second optical sensor 104 located at the front-end 208 of the SAV 200. Moreover, the SAV 200 may include a plurality of control surfaces 218, 220, 222, 224, and 226 for flying the SAV 200 in a direction 228 along a flight path to a programmed location or target. In this example, the SAV 200 may include a retro-fit kit that includes a first portion of the retro-fit kit 230 and second portion of the retro-fit kit 232 that may be placed on an existing non-guided aerial vehicle 234.

Figure 3:
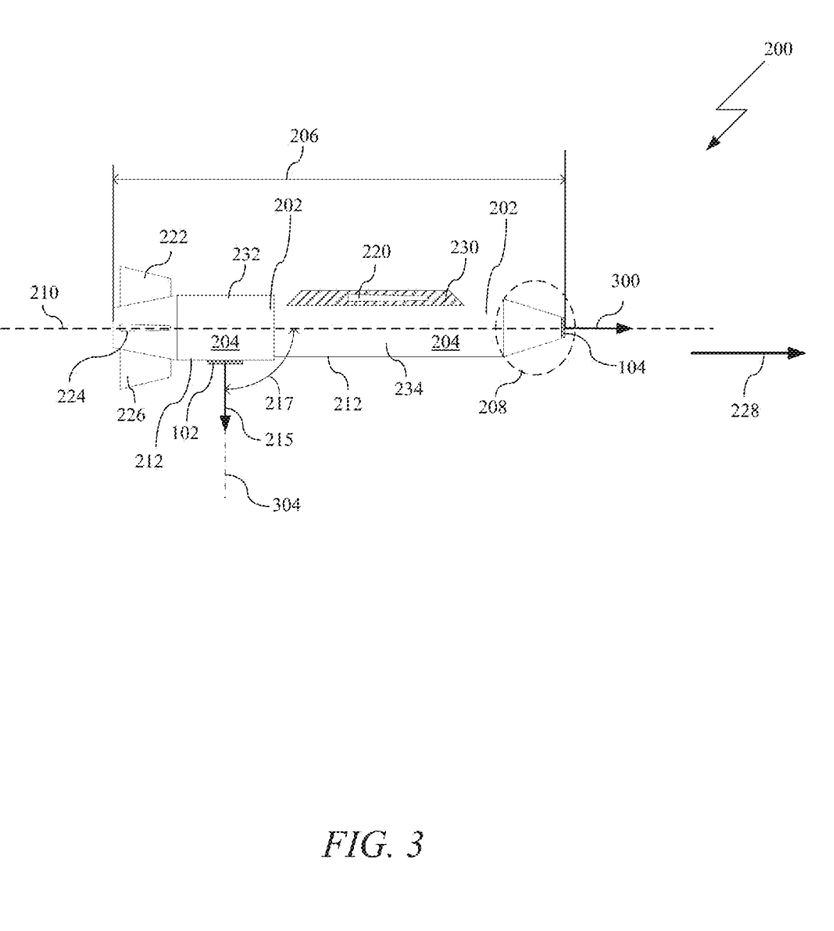
FIG. 3 is a side-view of the SAV shown in FIG. 2.
Figure 4:
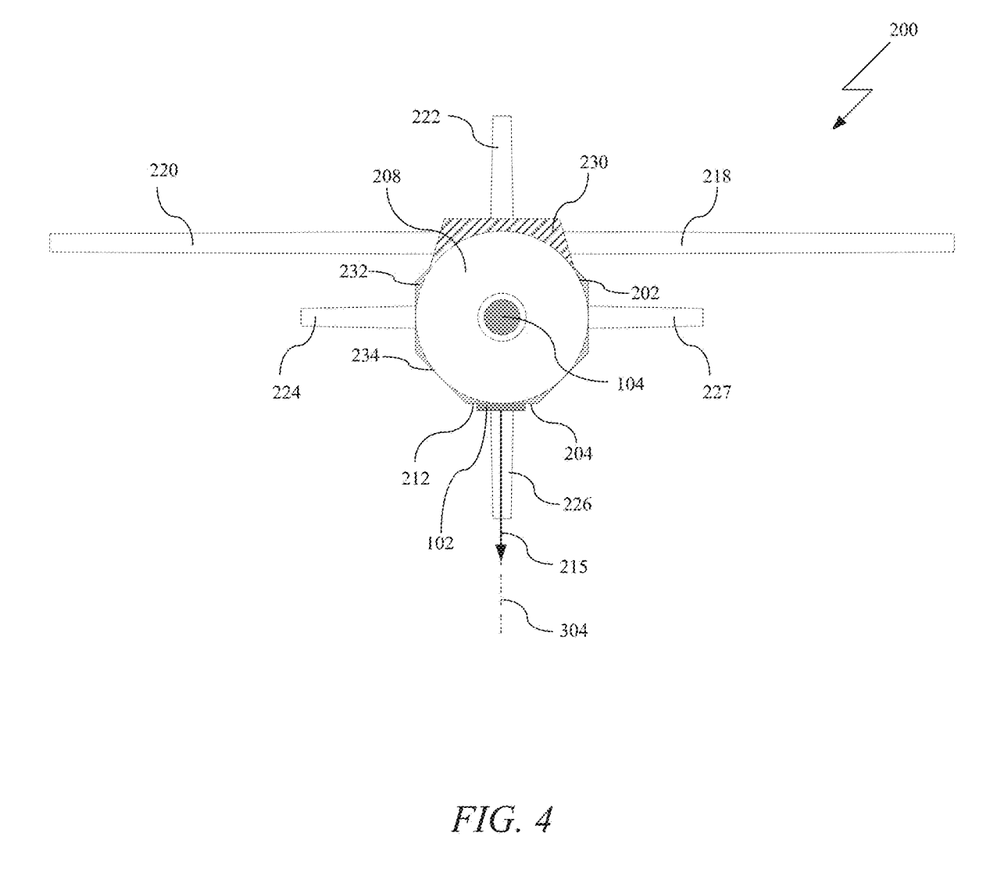
FIG. 4 is a front-view of the SAV shown in FIGS. 2, 3 and 4.

FIG. 3, a side-view of the SAV 200 (shown in FIG. 2) is shown. In this view, the first optical sensor 102 is located on the bottom 212 of the SAV 200 along the outer surface 204 of the housing 202. In this example, the first optical sensor 102 is shown as being located at the second portion of the retro-fit kit 232; however, it is appreciated that if the SAV 200 is not a retrofitted existing non-guided vehicle 234, the first optical sensor 102 may be located anywhere along the bottom 212 of the SAV 200. The second optical sensor 104 is shown located at the front-end 208 of the SAV 200 directed along a direction 300 along the longitudinal axis 210 in the direction 228 of travel. The first optical sensor 102 is shown directed in the direction 215 normal 304 to the outer surface, or bottom, 212 of the SAV 200 that is direct downward towards the ground when the SAV 200 is in flight. In this example, the directed directions 215 and 300 of the first and second optical sensors 102 and 104 are shown to be approximately orthogonal (i.e., perpendicular) where the angle 217 between the direction 215 directed by the first optical sensor 102 is approximately ninety (90) degrees from the longitudinal axis 210. Turning to FIG. 4, a front-view of the SAV 200 is shown. In FIG. 4, an additional control surface 227 is shown.

Figure 5:
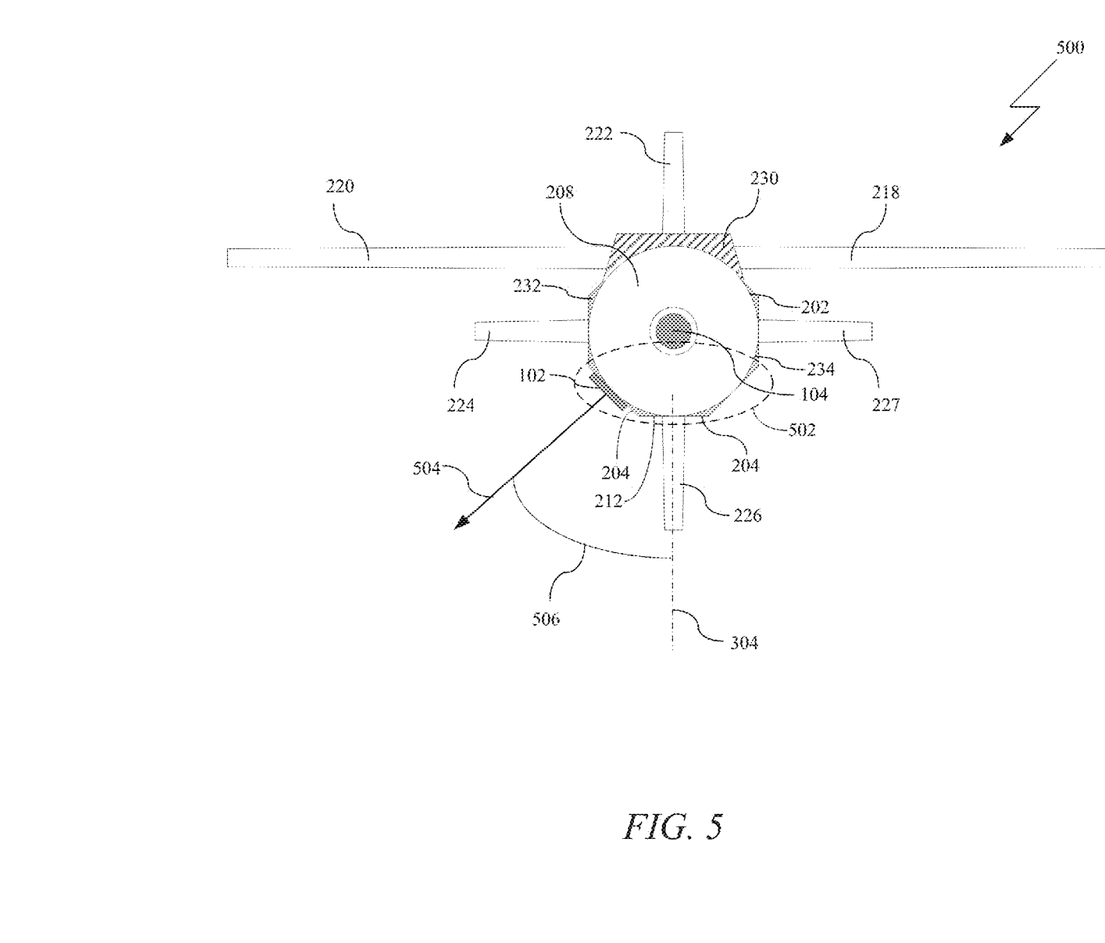
FIG. 5 is a front-view of an example of another implementation of a SAV having a GINS.

In FIG. 5, a front-view of an example of another implementation of a SAV 500 having a GINS (such as GINS 100 shown in FIG. 1), is shown. As described earlier, the SAV 500 may include the housing 202, where the housing 202 has an outer surface 204, a length (not shown), the front-end 208, the longitudinal axis (not shown) along the length of the housing 202, and the bottom 212. In this example, the SAV 500 includes the first optical sensor 102 located at a bottom portion 502 of the SAV 500 and the second optical sensor 104 located at the front-end 208 of the SAV 500. Moreover, the SAV 500 may include the plurality of control surfaces 218, 220, 222, 224, 226, and 227 for flying the SAV 500 in a direction along a flight path to a programmed location or target. Similar to before, in this example, the SAV 500 may include a retro-fit kit that include a first portion of the retro-fit kit 230 and second portion of the retro-fit kit 232 that may be placed on an existing non-guided aerial vehicle. Unlike, the example shown in FIG. 4, in FIG. 5, the first optical sensor 102 may be placed along the outer surface 204 of SAV 500 such that the first optical sensor 102 is directed in a direction at angle 504 that is at an oblique angle 506 to the normal 304 to the outer surface 204 of the SAV 500 that is directed downward towards the ground when the SAV 500 is in flight.

Figure 6:
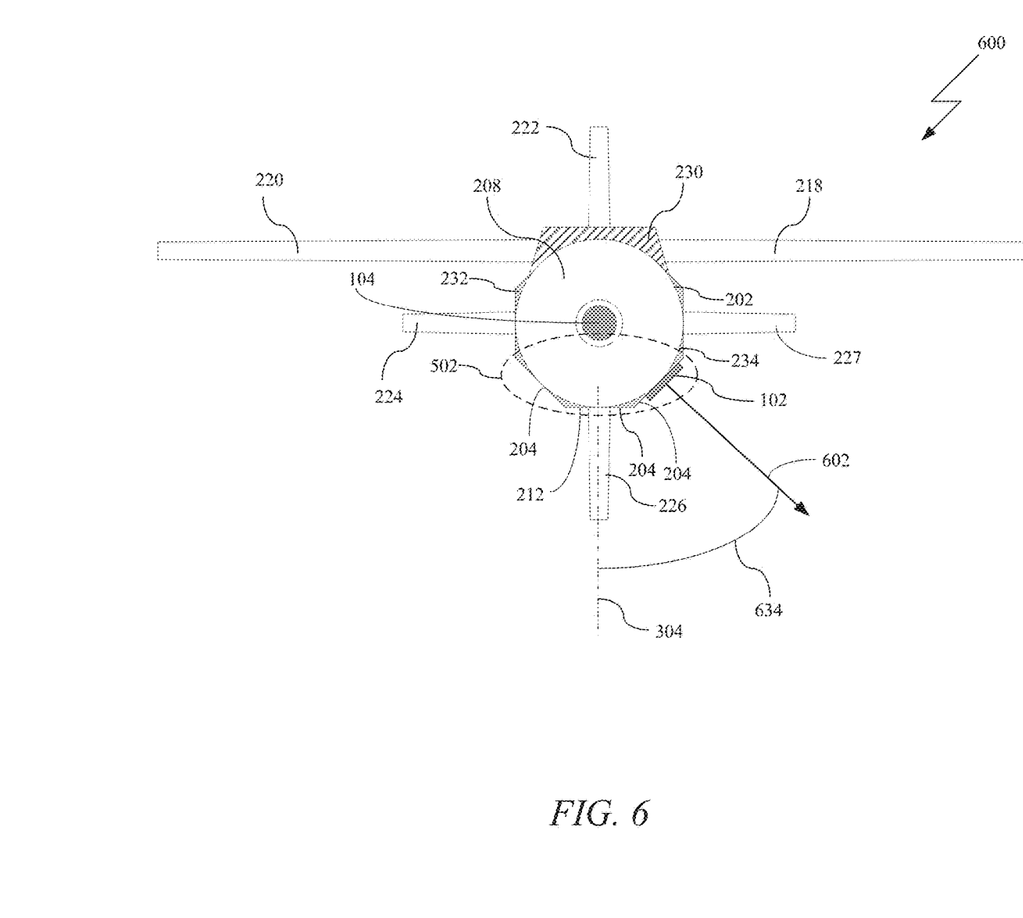
FIG. 6 is a front-view of an example of alternative implementation of a SAV having a GINS.

In FIG. 6, a front-view of an example of alternative implementation of a SAV 600 having a GINS (such as the GINS 100 shown in FIG. 1), is shown. As described earlier, the SAV 600 may include the housing 202, where the housing 202 has an outer surface 204, a length (not shown), the front-end 208, a longitudinal axis (not shown) along the length of the housing 202, and a bottom 212. In this example, the SAV 600 includes the first optical sensor 102 located at the bottom portion 502 of the SAV 600 and second optical sensor 104 located at the front-end 208 of the SAV 600. Moreover, the SAV 600 may include the plurality of control surfaces 218, 220, 222, 224, 226, and 227 for flying the SAV 600 in a direction along a flight path to a programmed location or target. Similar to before, in this example, the SAV 600 may include a retro-fit kit that include the first portion of the retro-fit kit 230 and second portion of the retro-fit kit 232 that may be placed on an existing non-guided ordinance. Unlike, the example shown in FIG. 5, in FIG. 6, the first optical sensor 102 may be placed along the outer surface 204 of SAV 600 along the other side of the bottom portion 502 of the SAV 600 such that the first optical sensor 102 is directed in a direction 602 that is also at another oblique angle 604 to the normal 304 to the outer surface 204 that is of the SAV 600 that is directed downward towards the ground when the SAV 600 is in flight. However, the oblique angle 634 is directed towards a second portion of the bottom portion 502, while the oblique angle 504 (shown in FIG. 5) is directed towards the first portion of the bottom portion 502.

If an optional third optical sensor (not shown) is present, the third optical sensor may be placed along the first portion of the bottom portion 502 as is shown in FIG. 5. As an example, the first optical sensor 102 and a third optical sensor may directed in different directions where the angle of separation between the different directed directions may be approximately 90 degrees or less if the first optical sensor 102 and third optical sensor are assumed to be at most about 45 degrees away from the normal direction 304 towards the ground; however, based on the design it is appreciated that the angle of separation between the different directed directions may be also greater than 90 degrees.

Figure 7:
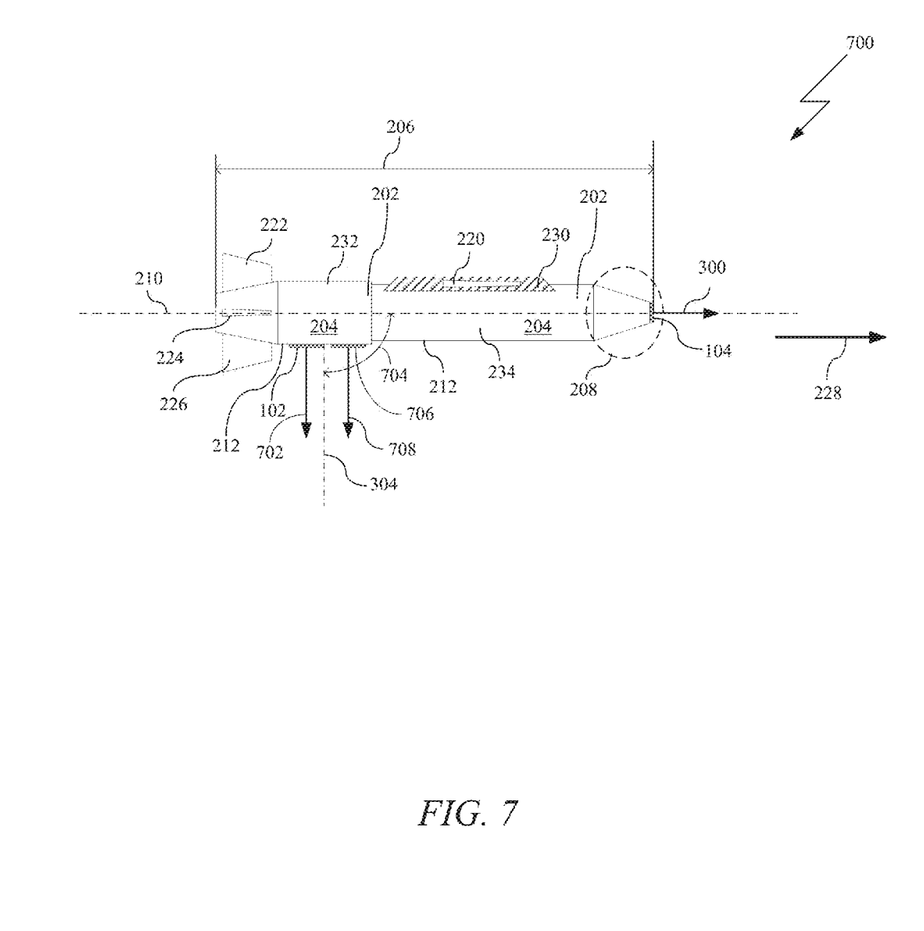
FIG. 7 is a side-view of an example of yet another alternative implementation of a SAV having a GINS.

Turning to FIG. 7, a side-view of an example of yet another alternative implementation of a SAV 700 having a GINS (such as the GINS 100 shown in FIG. 1), is shown. As before, the SAV 700 may include the housing 202, where the housing 202 has an outer surface 204, a length 206, a front-end 208, a longitudinal axis 210 along the length 206 of the housing 202, and a bottom 212. The SAV 700 may also include the first optical sensor 102 located at the bottom 212 of the SAV 700 and second optical sensor 104 located at the front-end 208 of the SAV 700. Moreover, the SAV 700 may include the plurality of control surfaces 218, 220, 222, and 224 for flying the SAV 700 in a direction 228 along a flight path to a programmed location or target. As before, in this example, the SAV 700 may include a retro-fit kit that include a first portion of the retro-fit kit 230 and second portion of the retro-fit kit 232 that may be placed on an existing non-guided ordinance 234. In this view, it is appreciated that the first optical sensor 102 is located on the bottom 212 of the SAV 700 along the outer surface 204 of the housing 202. In this example, the first optical sensor 102 is shown as being located at the second portion of the retro-fit kit 232; however, it is again appreciated that if the SAV 700 is not a retrofitted existing non-guided ordinance 234, the first optical sensor 102 may be located anywhere along the bottom 212 of the SAV 700. The second optical sensor 104 is shown located at the front-end 208 of the SAV 700 directed along the direction 300 along the longitudinal axis 210 which corresponds with the direction 228 of travel along the flight path.

The first optical sensor 102 is shown directed in a direction 702 normal 304 to the outer surface, or bottom, 212 of the SAV 700 that is direct downward towards the ground when the SAV 700 is in flight. As before, in this example, the directed directions 702 and 300 of the first and second optical sensors 102 and 104 are shown to be approximately orthogonal (i.e., perpendicular) where the angle 704 between the direction 702 directed by the first optical sensor 102 is approximately ninety (90) degrees from the longitudinal axis 210. However, unlike the example in FIG. 3, in FIG. 7, the SAV 700 also includes a third optical sensor 706 that may be located proximate to the first optical sensor 102 along the outer surface 204. In this example, the first and third optical sensors 102 and 706 may located at the bottom 212 of the SAV 700 and the third optical sensor 706 may be directed in a direction 708 that is parallel with the directed direction 702 of the first optical sensor 102. This would result in both the first and third optical sensors 102 and 706 being able to acquire a plurality of real-time down-looking images looking beneath the SAV 700 that would be offset by a small amount. By utilizing these additional down-looking images, the comparator 110 of the GINS would be able to produce higher correlated results when comparing these images to the stored reference images 158 in the database 108 of the GINS. It is also appreciated that in this example that first and third optical sensors 102 and 706 may be directed in different directions that would allow for a combined acquisition of down-looking images with different angle perspectives similar to the discussion related to FIG. 6.

Figure 8:
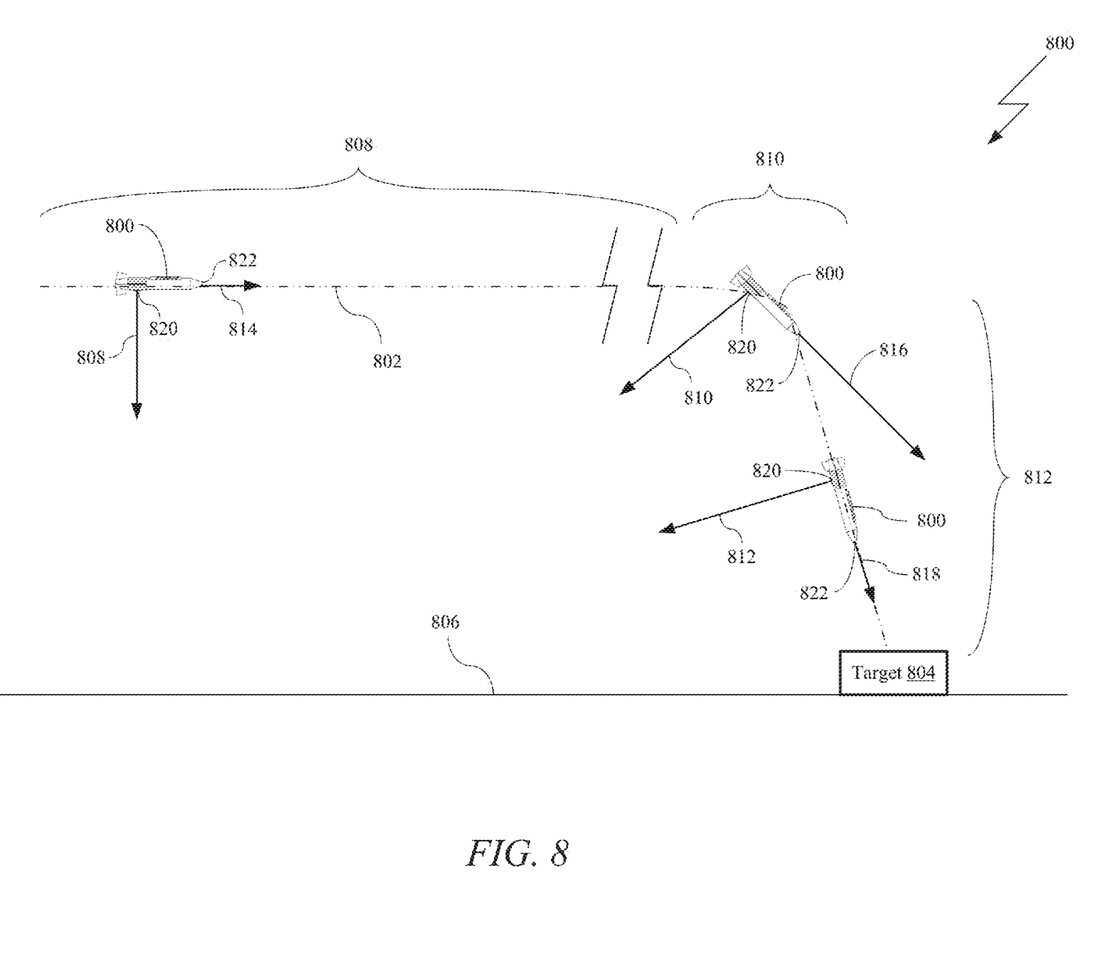
FIG. 8 is a system diagram of an example of an implementation of the operation of the SAV traveling along a flight path to a target.

Turning to FIG. 8, a system diagram of an example of an implementation of the operation of the SAV 800 traveling along a flight path 802 to a target 804 on the ground 806 is shown. In this example, the SAV 800 may be implemented as any of the examples of the implementations of the SAVs 200, 500, 600, and 700 shown in FIGS. 1 through 7. In this example, at first the SAV 800 travels along the mid-cruise portion 808 of the flight path 802 to a transition portion 810 of the flight path 802, where SAV switches direction to a terminal portion 812 of the flight path that lead to the location of the target 804. In FIG. 8, it is appreciated that the aimed directions 808, 810, 812, 814, 816, and 818 of both the first optical sensor 820 and second optical sensor 822, respectively, change along the mid-cruise portion 808, transition portion 810, and terminal portion 812 of the flight path 802. As an example, in the mid-cruise portion 808 of the flight path 802 the first optical sensor 820 is aimed in a direction 808 downward towards the ground 806 that allows the first optical sensor 820 to acquire real-time down-looking images of the ground for use by the navigation system to guide the SAV 800 along the flight path 802. The second optical sensor 822 would be acquire real-time forward-looking images of horizon in front of the SAV 800 which may allow for attitude adjustment of the SAV 800 to keep the SAV 800 flying level along the flight path 802. Once the transition portion 810 of the flight path is reached by the SAV 800, the SAV 800 adjusts its pitch to pitch down towards the target 804 and follow the terminal portion 812 of the flight path 802. At this point the aimed direction 810 of the first optical sensor 820 begins to move away from aiming at the ground 806 and aiming towards the horizon. Similarly, the aimed direction 816 of the second optical sensor 822 begins to move away from aiming at the horizon and aiming towards the ground 806 and ultimately the target 804. At a certain point within the transition portion 810, the first optical sensor 820 may no longer be able to acquire real-time look-down images of the ground 806 and the GINS will begin to utilize the acquired real-time look-forward images of the second optical sensor 822 as it begins to be aimed in the direction 816 towards the ground. Once the terminal portion 812 of the flight path 802 is reached, the first optical sensor 820 may be aimed in a direction 812 that no longer "sees" the ground 806 and is not able to acquire meaningful real-time look-down images of the ground 806, while the second optical sensor 822 is aimed in the direction 818 of the target 804 such that the second optical sensor 822 is now able to acquire accurate forward-looking images of the target 804 along the terminal portion 812 of the flight path 802 before impact.

Figure 9:
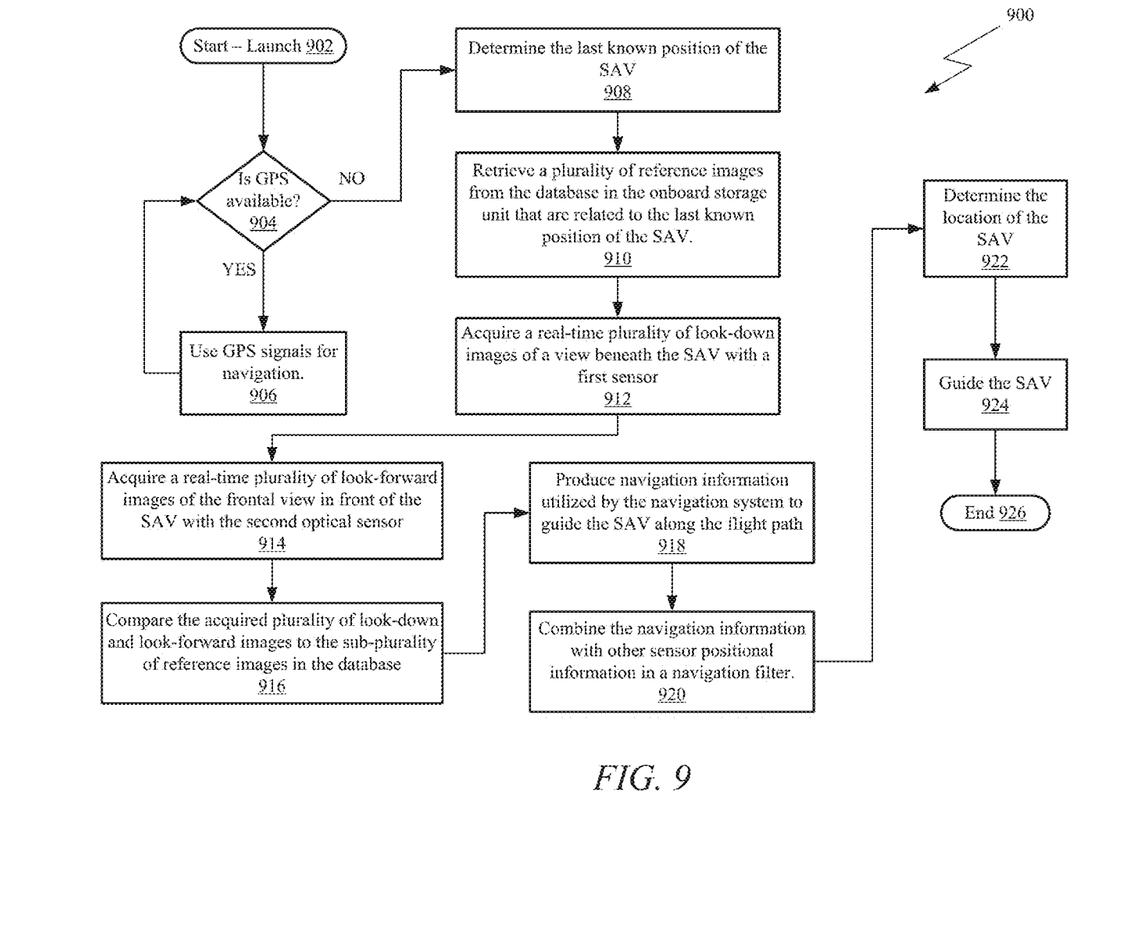
FIG. 9 is a flowchart of an example of an implementation of a method performed by the GINS.

In FIG. 9, a flowchart of an example of an implementation of a method 900 performed by the GINS 100 (shown in FIG. 1) on board a SAV such as, for example, the SAV 200, 500, 600, 700, and 800 shown in FIGS. 1 through 8). The method 900 starts 902 by launching the SAV either from an aircraft or a ground position. The GINS 100 on-board the SAV determines if GPS signals are available, denied, or degraded in decision step 904. If GPS signals are available and not degraded, the GINS may utilize the GPS signals for navigation in step 906 and the method 900 returns to decision step 904 to constantly monitor whether GPS signals continue to be available, denied, or degraded. If the GPS signal are not available (either because they are denied in the environment or unavailable for other reasons) or degraded, the method 900 continues instead to step 908.

In step 908, the GINS 100 determines the last known position of the SAV, where the last known position may be provided by a launch vehicle (such as, for example, an aircraft) in the case of air-to-ground SAV or it may be the last known position of the SAV before entering into a GPS denied or degraded area along the flight path to a target. In step 910, the GINS 100 retrieves a sub-plurality of reference images from the database 108 in the onboard storage unit 106 that are related to the last known position of the SAV so that the comparator 110 is capable of comparing the retrieved sub-plurality of reference images 158 against real-time acquired images 154 and 156 from both the first and second optical sensors 102 and 104. The GINS 100 then acquires a real-time plurality of look-down images 154 of a view beneath the SAV with the first optical sensor 102 in step 912 and, in step 914, acquires a real-time plurality of look-forward images 156 of the frontal view in front of the SAV with the second optical sensor 104.

The comparator 110 then compares the acquired plurality of look-down and look-forward images 154 and 156 to the sub-plurality of reference images 158 in the database 108, in step 916, and, in response in step 918, produces navigation information utilized by the navigation system 112 to guide the SAV along the flight path. The method 900 then combines the navigation information with other sensor positional information in a navigation filter 114 to produce a location of the SAV in step 920. As discussed earlier, the navigation filter 114 may be a Kalman filter and the other sensor positional information may be positional information provided by devices that include a GPS tracker 118 (assuming the environment is GPS degraded but not denied), IMU 120, and altimeter 122. The navigation system 112 then determines the location of the SAV along the flight path, in step 922, and guides the SAV along the flight path, in step 924. The method 900 then ends 926.

It will be understood that various aspects or details of the implementations may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A Global Positioning System ("GPS") independent navigation system ("GINS") for a self-guided aerial vehicle ("SAV") having a housing, wherein the housing has an outer surface, a length, a front-end, and a longitudinal axis along the length of the housing, the GINS comprising:
   a first optical sensor, wherein the first optical sensor is located along the outer surface of the housing and is directed at a first angle with respect to the longitudinal axis;
   a second optical sensor, wherein the second optical sensor is located along the outer surface of the housing and is directed at a second angle with respect to the longitudinal axis;
   a storage unit, wherein the storage unit is configured to include a database of a plurality of reference images; and
   a comparator, wherein the comparator is in signal communication with the first optical sensor, the second optical sensor, and the storage unit,
   wherein the first optical sensor is configured to acquire a first plurality of images of a first view with respect to the SAV when the SAV is in flight,
   wherein the second optical sensor is configured to acquire a second plurality of images of a second view with respect to the SAV when the SAV is in flight, and
   wherein the comparator is configured to compare the first plurality of acquired images and the second plurality of acquired images to the plurality of reference images in the database, and, in response, produce navigation information utilized to guide the inflight SAV.

2. The GINS of claim 1, wherein the first angle is approximately ninety (90) degrees from the longitudinal axis.

3. The GINS of claim 2,
   wherein the second optical sensor is located at the front-end of the housing and
   wherein the second optical sensor is directed in a direction approximately along the longitudinal axis,
   wherein the first plurality of acquired images is a plurality of look-down images and the first view is a view beneath the SAV when the SAV is in flight, and
   wherein the second plurality of acquired images is a plurality of look-forward images of a frontal view of the SAV when the SAV is in flight.

4. The GINS of claim 3, wherein the second angle is approximately equal to zero.

5. The GINS of claim 4,
   wherein the SAV is configured to travel in a direction that is collinear with the longitudinal axis of the housing and
   wherein the first optical sensor is directed obliquely from a normal direction from the outer surface.

6. The GINS of claim 1, wherein the comparator includes a processing device selected from the group consisting of a correlator, digital signal processor ("DSP"), and processor.

7. The GINS of claim 1, further including
a navigation filter and
an inertial measurement unit ("IMU"),
wherein the navigation filter is in signal communication with both the comparator and IMU.

8. The GINS of claim 7, further including
an altimeter,
wherein the altimeter is in signal communication with the navigation filter.

9. The GINS of claim 8, further including
a GPS tracker,
wherein the GPS tracker is in signal communication with the navigation filter and
wherein the GPS tracker is configured to produce GPS positional information measurements that are transmitted to the navigation filter.

10. The GINS of claim 9, wherein the navigation filter includes a Kalman filter.

11. The GINS of claim 1, further including a third optical sensor, wherein the third optical sensor is located along the outer surface of the housing and is directed at a third angle away from the outer surface.

12. The GINS of claim 11,
wherein the first angle is approximately ninety (90) degrees from the longitudinal axis,
wherein the SAV is configured to travel in a direction that is collinear with the longitudinal axis of the housing,
wherein the first optical sensor is directed obliquely at a first right angle from the direction of travel, and
wherein the third optical sensor is directed obliquely at a second right angle from the direction of travel.

13. The GINS of claim 1, wherein the first optical sensor and second optical sensor are infrared cameras.

14. A self-guided aerial vehicle ("SAV") having a navigation system, the SAV comprising:
a housing having an outer surface, a length, a front-end, and a longitudinal axis along the length of the housing;
a first optical sensor, wherein the first optical sensor is located along the outer surface of the housing and is directed at a first angle with respect to the longitudinal axis;
a second optical sensor, wherein the second optical sensor is located along the outer surface of the housing and is directed at a second angle with respect to the longitudinal axis;
a storage unit, wherein the storage unit is configured to include a database of a plurality of reference images; and
a comparator, wherein the comparator is in signal communication with the first optical sensor, the second optical sensor, and the storage unit,
wherein the first optical sensor is configured to acquire a first plurality of images of a first view with respect to the SAV when the SAV is in flight,
wherein the second optical sensor is configured to acquire a second plurality of images of a second view with respect to the SAV when the SAV is in flight, and
wherein the comparator is configured to compare the first plurality of acquired images and the second plurality of acquired images to the plurality of reference images in the database, and, in response, produce navigation information utilized by the navigation system to guide the inflight SAV.

15. The SAV of claim 14,
wherein the first angle is approximately ninety (90) degrees from the longitudinal axis,
wherein the second optical sensor is located at the front-end of the housing and
wherein the second optical sensor is directed in a direction approximately along the longitudinal axis,
wherein the first plurality of acquired images is a plurality of look-down images and the first view is a view beneath the SAV when the SAV is in flight, and
wherein the second plurality of acquired images is a plurality of look-forward images of a frontal view of the SAV when the SAV is in flight.

16. The SAV of claim 15,
wherein the SAV is configured to travel in a direction that is collinear with the longitudinal axis of the housing and
wherein the first optical sensor is directed obliquely from a normal direction from the outer surface.

17. A method for guiding an inflight self-guided aerial vehicle ("SAV") with a navigation system utilizing a first optical sensor, a second optical sensor, a database of a plurality of reference images, and a comparator, the method comprising:
acquiring, with the first optical sensor, a first plurality of images of a first view with respect to the SAV when the SAV is in flight;
acquiring, with the second optical sensor, a second plurality of images of a second view with respect to the SAV when the SAV is in flight;
comparing the first plurality of acquired images and the second plurality of acquired images to the plurality of reference images in the database, and, in response, producing navigation information utilized by the navigation system to guide the inflight SAV; and
providing the navigation information to the navigation system, wherein the navigation system utilizes the navigation information to guide the inflight SAV.

18. The method of claim 17,
wherein the first plurality of acquired images is a plurality of look-down images and the first view is a view beneath the SAV when the SAV is in flight and
wherein the second plurality of acquired images is a plurality of look-forward images of a frontal view of the SAV when the SAV is in flight.

19. The method of claim 17, further including
determining if Global Positioning System ("GPS") signals are available to the SAV,
determining a last known position of the SAV, and
retrieving a sub-plurality of reference images from the database of the plurality of reference images, wherein the sub-plurality of reference images are related to the last known position of the SAV.

20. The method of claim 19, further including
Kalman filtering the navigation information along with other sensor information,
determining a location for the SAV, and
guiding the SAV,
wherein the other sensor information includes GPS information, inertial measurement unit ("IMU") information, and altimeter information.

* * * * *